US012170657B2

(12) United States Patent
Castinado et al.

(10) Patent No.: US 12,170,657 B2
(45) Date of Patent: Dec. 17, 2024

(54) GENERATING DYNAMIC SECURITY QUERIES FOR KNOWLEDGE-BASED AUTHENTICATION BASED ON HISTORICAL DATASETS

(71) Applicant: BANK OF AMERICA CORPORATION, Charlotte, NC (US)

(72) Inventors: Joseph Benjamin Castinado, North Glenn, CO (US); Brandon Ingram, Charlotte, NC (US); Naoll Addisu Merdassa, Chakopee, MN (US); Kevin Graham Robberts, Charlotte, NC (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 531 days.

(21) Appl. No.: 17/388,550

(22) Filed: Jul. 29, 2021

(65) Prior Publication Data
US 2023/0035919 A1 Feb. 2, 2023

(51) Int. Cl.
*H04L 9/40* (2022.01)
*G06F 16/23* (2019.01)
*G06Q 40/02* (2023.01)
*G06Q 40/06* (2012.01)

(52) U.S. Cl.
CPC ........ *H04L 63/083* (2013.01); *G06F 16/2379* (2019.01); *G06Q 40/02* (2013.01); *G06Q 40/06* (2013.01)

(58) Field of Classification Search
CPC ... H04L 63/083; H04L 63/08; G06F 16/2379; G06F 21/316; G06Q 40/02
See application file for complete search history.

(56) References Cited

U.S. PATENT DOCUMENTS

| | | | |
|---|---|---|---|
| 7,908,644 B2 | 3/2011 | Roskind et al. | |
| 8,650,405 B1 | 2/2014 | Dotan et al. | |
| 8,745,698 B1 * | 6/2014 | Ashfield | H04L 63/08 726/4 |
| 9,094,388 B2 | 7/2015 | Tkachev | |
| 9,396,319 B2 | 7/2016 | Shuart et al. | |
| 9,672,335 B2 | 6/2017 | Shuart et al. | |
| 9,674,177 B1 | 6/2017 | Nystrm | |
| 10,609,014 B2 | 3/2020 | Tunnell et al. | |
| 11,663,595 B1 | 5/2023 | Houseworth et al. | |
| 2003/0154406 A1 | 8/2003 | Honarvar et al. | |
| 2005/0039056 A1 | 2/2005 | Bagga et al. | |

(Continued)

*Primary Examiner* — Esther B. Henderson
(74) *Attorney, Agent, or Firm* — Moore & Van Allen PLLC; James C. Edwards

(57) ABSTRACT

Dynamic security queries are generated based on historical records for purposes of knowledge-based authentication. The dynamic nature of the queries and answers means that once generated, the queries and the answers are exclusively stored in temporary memory (i.e., Random Access Memory (RAM) or the like). As such, the queries and answers are permanently erased from RAM after they have been presented to the user or, at a maximum, are erased from RAM once the computing session is terminated. Moreover, since the queries/answers are determined from dynamic user-specific datasets compiled at the time of authentication, the present invention is able to generate knowledge-based queries that are not capable of identification by other parties from any level of personal record searching.

14 Claims, 4 Drawing Sheets

(56) References Cited

U.S. PATENT DOCUMENTS

| | | |
|---|---|---|
| 2007/0022300 A1 | 1/2007 | Eppert et al. |
| 2007/0219792 A1 | 9/2007 | Normandin |
| 2010/0070892 A1 | 3/2010 | Metz, Jr. et al. |
| 2017/0041296 A1* | 2/2017 | Ford ................ G06F 21/64 |
| 2021/0173916 A1* | 6/2021 | Ortiz ............... H04L 9/3213 |
| 2021/0294890 A1* | 9/2021 | Pham .............. H04L 9/3226 |
| 2023/0004972 A1* | 1/2023 | Rapowitz ......... G06Q 20/405 |
| 2023/0035919 A1* | 2/2023 | Castinado ........ G06F 16/9035 |

\* cited by examiner

GENERATING DYNAMIC SECURITY QUERIES FOR KNOWLEDGE-BASED AUTHENTICATION BASED ON HISTORICAL DATASETS

FIELD OF THE INVENTION

The present invention is generally directed to computing security and, more specifically, authenticating users based on knowledge-based queries that are dynamically determined from historical datasets.

BACKGROUND

Knowledge-based authentication has been used as one means of verifying a user's identity. Such authentication typically requires a user to choose from amongst a series of predefined questions/queries (e.g., mother's middle name, high school mascot, and the like) and submit an answer to each chosen question. The answers, and in some instances the questions, are stored in a user catalog, such that, once the user subsequently requires authentication for access purposes or the like, the user is presented one or more of the previously chosen questions and must provide the same answer previously submitted (i.e., the answer stored in the user's catalog) in order to authenticate themselves.

However, the problem with typical knowledge-based authentication is that the questions tend to be redundant and, moreover, the answers, while personal to the user, can readily be found within public records (e.g., mother's middle name, high school mascot or the like). Moreover, since the answers are stored in the user's catalog, if the user's catalog is compromised, then would-be wrongdoers would be able to answer the questions as a means of impersonating the user (i.e., wrongfully gaining access to applications or services and/or nefariously conducting unauthorized activities).

Therefore, a need exists to develop systems, methods, computer program products and that like that generates knowledge-based questions/queries that are dynamically generated on-the-fly and are unique to the user. In this regard, the answers to such questions should not be capable of determination from any level of personal record searching. Moreover, the questions/queries and answers should not be susceptible to be uncovered by a nefarious entity. In this regards, the questions/queries and the answers should not be stored in a user catalog or any other means of permanent computer storage.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by generating dynamic security queries for knowledge-based authentication based on historical records. In this regard, once a user has a need to authenticate (e.g., gain access to an application or service or perform a function requiring authentication), the present invention retrieves a historical dataset associated with the user from a historical datastore. Dynamic security queries and the answers are then determined from the historical dataset and the queries are presented to the user. The user will either have first-hand knowledge of the answers to the queries or be able to readily search within user-specific datastores to find the answers to the queries.

In specific embodiments of the invention, the historic datastores may include, but are not limited, a purchase transaction historical datastore, an investment transaction historical datastore, a user location historic datastore, a financial account balance historical datastore or the like. Thus, in such embodiments of the invention the queries and the answers are determined/derived from data in such datastores.

Moreover, in accordance with other specific embodiments of the invention, the dynamic nature of the queries and answers means that once generated, the queries and the answers are exclusively stored in temporary memory (i.e., Random Access Memory (RAM) or the like). This means that the questions and answers are permanently erased from the temporary memory after they have been presented to the user or, at a maximum, are erased from the temporary memory once the computing session is terminated.

In other specific embodiments of the invention, the presenting of the dynamic security queries is part of a two-part authentication process, in which both parts rely on the historical dataset. Specifically, in the two-part authentication process the historical dataset is relied upon by encryption algorithms that use a random subset of one or more historical datasets (including the historical dataset used to determine the queries/answers) to generate authentication tokens that are subsequently exchanged amongst a user device and/or a managing entity and the application/service. Once authentication is required, the user device/managing entity presents the authentication key to the application/service which verifies that the authentication key is the authentication key of record for the user (i.e., matches the authentication key previously exchanged/shared). In specific embodiments of the invention, the authentication key-based authentication is conducted first and, if such authentication fails or is otherwise unable to be performed, the security query knowledge-based authentication proceeds.

Thus, since the queries/answers are determined from dynamic user-specific datasets compiled at the time of authentication, the present invention is able to generate knowledge-based queries that are not capable of identification by other parties from any level of personal record searching. Moreover, since the queries/answers are time-sensitive and not stored in a user catalog or any other means of permanent computer storage, the queries and answers are not readily susceptible to being uncovered by a wrongdoer in pursuit of impersonating the user for purposes of gaining access to the user's applications and/or conducting unauthorized activities on behalf of the user.

A system for user authentication defines first embodiments of the invention. The system includes one or more datastores, each datastore configured to store historical data associated with a plurality of users. The system additionally includes a computing platform having a memory, and one or more processing devices in communication with the memory. The memory includes Random Access Memory (RAM) and Read-Only Memory (ROM). The ROM stores instructions that are executable by the one or more processing devices. The instructions are configured to receive, from one of the plurality of users, a request to access a service or application, and, in response to receiving the request, receive, from the at least one of the one or more datastores, a historical dataset associated with one of the plurality of users. The instructions are further configured to determine one or more security queries and answers for the one or more security queries based on the historical dataset, and authenticate the user by presenting at least one of the one or more security queries to the user and receiving user responses to the least one of the one or more security querier that match the answers for the one or more security queries.

In specific embodiments of the system, the instructions are further configured to store the one or more security queries and the answers exclusively in the RAM. This means that since the queries and the answers are not stored in the ROM, they are only stored temporarily (i.e., for the duration of the computing session or the like).

In further specific embodiments of the system, the instructions are further configured to determine a subset of the historical dataset, and apply, via an encryption engine, a plurality of encryption algorithms to a selection of data from the determined subset of the historical dataset. The selection of data is chosen at random. Further, in such embodiments of the system, the instructions are configured to generate, via the encryption engine, an authentication token. The authentication token is based on a set of results of the plurality of encryption algorithms. In response to generating the authentication token, the instructions are further configured to exchange the authentication token amongst (i) the service or application, and (ii) at least one of a user device or a managing entity, for storage at (i) the service or application, and (ii) at least one of a user device or a managing entity. Moreover, in such embodiments the instructions are further configured to, in response to receiving the request to access the service or application, transmit the authentication token from the user device or the managing entity to the service or application. The service or application authenticates the user by verifying that the transmitted authentication token matches the exchanged authentication token stored at the service or application. In related embodiments of the system, the instructions are configured to initially attempt to authenticate the user verifying that the transmitted authentication token matches the exchanged authentication token stored at service or application and, in an instance in which the verification fails, authenticate the user by presenting at least one of the one or more security queries to the user and receiving user responses to the least one of the one or more security querier that match the answers for the one or more security queries.

In further specific embodiments of the system, the one or more datastores further includes a purchase transaction datastore configured to store historical purchase transaction data for purchase transactions conducted by the plurality of users. In related embodiments of the system, the instructions configured to receive, from the at least one of the one or more datastores, a historical dataset associated with one of the plurality of users are further configured to receive, from the historical purchase transaction datastore, a historical purchase transaction dataset for purchase transactions conducted by the one of the plurality of users. Further, the instructions configured to determine one or more security queries and answers for the one or more security queries based on the historical dataset are further configured to determine the one or more security queries and the answers for the one or more security queries based on the historical purchase transaction dataset.

In still further specific embodiments of the system, the one or more datastores further include at least one of (i) a historical investment datastore, (ii) a historical account balance datastore, and (iii) a historical user location datastore. In related embodiments of the system, the instructions configured to receive, from the at least one of the one or more datastores, a historical dataset associated with one of the plurality of users are further configured to receive, from the historical purchase transaction datastore and at least one of (i) the historical investment datastore, (ii) the historical account balance datastore, and (iii) the historical user location datastore, a historical purchase transaction dataset for purchase transactions conducted by the one of the plurality of users and at least one of (a) a historical investment transaction dataset for investment transactions conducted by the one of the plurality of users, (b) a historical account balance dataset for a financial account held by the one of the plurality of users, and (c) a historical location dataset for locations at which the one of the plurality of users physically resided at associated points in time. Further, the instructions configured to determine one or more security queries and answers for the one or more security queries based on the historical dataset are further configured to determine the one or more security queries and the answers for the one or more security queries based on the historical purchase transaction dataset and at least one of (a) the historical investment transaction dataset, (b) the historical account balance dataset, and (c) the historical user location dataset.

A computer-implemented method for user authentication defines second embodiments of the invention. The computer-implemented method is executable by one or more computing processor devices. The method includes receiving a request for a user to access a service or application, and, in response to receiving the request, receiving, from at least one historical datastore, at least one historical dataset associated with the user. The method further includes determining one or more security queries and answers for the one or more security queries based on the historical dataset, and authenticating the user by presenting at least one of the one or more security queries to the user and receiving user responses to the least one of the one or more security querier that match the answers for the one or more security queries.

In specific embodiments the method further includes storing the one or more security queries and answers for the one or more security queries exclusively in Random Access Memory (RAM).

In other specific embodiments, the method further includes determining a subset of the historical dataset, and applying, via an encryption engine, a plurality of encryption algorithms to a selection of data from the determined subset of the historical dataset. The selection of data is chosen at random. The method further includes generating, via the encryption engine, an authentication token. The authentication token is based on a set of results of the plurality of encryption algorithms. In addition, the method includes, in response to generating the authentication token, exchanging the authentication token amongst (i) the service or application, and (ii) at least one of a user device or a managing entity, for storage at (i) the service or application, and (ii) at least one of a user device or a managing entity. Moreover, the method includes, in response to receiving the request to access the service or application, transmitting the authentication token from the user device or the managing entity to the service or application. The service or application authenticates the user by verifying that the transmitted authentication token matches the exchanged authentication token stored at the service or application. In further related embodiments of the method, verifying that the transmitted authentication token matches the exchanged authentication token stored at the service or application occurs prior to presenting at least one of the one or more security queries to the user.

In further specific embodiments of the method, receiving, from the at least one historical datastore, the at least one historical dataset associated with the user further includes receiving, from a purchase transaction datastore, a historical purchase transaction dataset comprising purchase transactions conducted by the user. In related embodiments of the method, determining the one or more security queries and the answers for the one or more security queries based on the historical dataset further includes determining the one or more security queries and the answers for the one or more security queries based on the historical purchase transaction dataset.

In other specific embodiments of the method, receiving, from the at least one historical datastore, the at least one historical dataset associated with the user further includes receiving, from at least one of (i) a historical investment datastore, (ii) a historical account balance datastore, and (iii) a historical user location datastore, at least one of (a) a historical investment transaction dataset comprising investment transactions conducted by the user, (b) a historical account balance dataset comprising account balances incurred by the user, and (c) a historical location dataset comprising geo-physical locations at which the user has been located. In addition, determining the one or more security queries and the answers for the one or more security queries based on the historical dataset further includes determining the one or more security queries and the answers for the one or more security queries based on at least one of (a), the historical investment transaction dataset, (b) a historical account balance dataset, and (c) the historical location dataset.

A computer program product including a non-transitory computer-readable medium defines third embodiments of the invention. The non-transitory computer-readable medium includes a first set of codes for causing a computer to receive a request for a user to access a service or application. In addition, the computer-readable medium includes a second set of codes for causing a computer to, in response to receiving the request, receive, from at least one historical datastore, at least one historical dataset associated with the user. Further, the computer-readable medium includes a third set of codes for causing a computer to determine one or more security queries and answers for the one or more security queries based on the historical dataset. In addition, the computer-readable medium includes a fourth set of codes for causing a computer to authenticate the user by presenting at least one of the one or more security queries to the user and receiving user responses to the least one of the one or more security querier that match the answers for the one or more security queries.

In specific embodiments of the computer program product, the computer-readable medium additionally includes a fifth set of codes for causing a computer to store the one or more security queries and answers for the one or more security queries exclusively in Random Access Memory (RAM).

In other specific embodiments of the computer program product, the computer-readable medium additionally includes a fifth set of codes for causing a computer to determine a subset of the historical dataset and a sixth set of codes for causing a computer to apply, via an encryption engine, a plurality of encryption algorithms to a selection of data from the determined subset of the historical dataset, wherein the selection of data is chosen at random. Additionally, the computer-readable medium includes a seventh set of codes for causing a computer to generate, via the encryption engine, an authentication token. The authentication token is based on a set of results of the plurality of encryption algorithms and an eighth set of codes for causing a computer to, in response to generating the authentication token, exchange the authentication token amongst (i) the service or application, and (ii) at least one of a user device or a managing entity, for storage at (i) the service or application, and (ii) at least one of a user device or a managing entity. Further, the computer-readable medium includes a ninth set of codes for causing a computer to, in response to receiving the request to access the service or application, transmit the authentication token from the user device or the managing entity to the service or application. The service or application authenticates the user by verifying that the transmitted authentication token matches the exchanged authentication token stored at the service or application.

In other specific embodiments of the computer program product, the second set of codes are further configured to cause the computer to receive, from a purchase transaction datastore, a historical purchase transaction dataset including purchase transactions conducted by the user, and the third set of codes are further configured to cause the computer to determine the one or more security queries and the answers for the one or more security queries based on the historical purchase transaction dataset.

Moreover, in additional embodiments of the computer program product, the second set of codes are further configured to cause the computer to receive, from at least one of (i) a historical investment datastore, (ii) a historical account balance datastore, and (iii) a historical user location datastore, at least one of (a) a historical investment transaction dataset comprising investment transactions conducted by the user, (b) a historical account balance dataset comprising account balances incurred by the user, and (c) a historical location dataset comprising geo-physical locations at which the user has been located. In such embodiments of the computer program product the third set of codes is further configured to cause the computer to determine the one or more security queries and the answers for the one or more security queries based on at least one of (a), the historical investment transaction dataset, (b) a historical account balance dataset, and (c) the historical location dataset.

Thus, according to embodiments of the invention, which will be discussed in greater detail below, the present invention addresses needs and/or achieves other advantages by generating dynamic security queries for knowledge-based authentication based on historical records. The dynamic nature of the queries and answers means that once generated, the queries and the answers are exclusively stored in temporary memory (i.e., Random Access Memory (RAM) or the like). Moreover, since the queries/answers are determined from dynamic user-specific datasets compiled at the time of authentication, the present invention is able to generate knowledge-based queries that are not capable of identification by other parties from any level of personal record searching.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
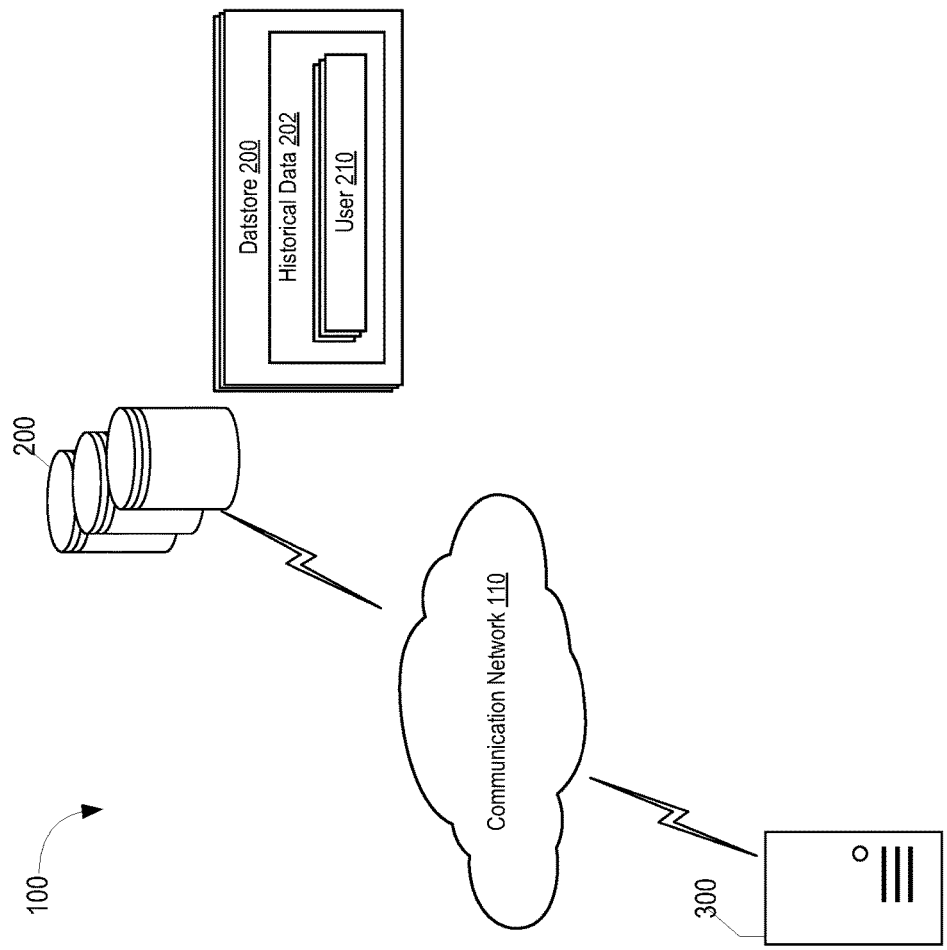
Figure 2:
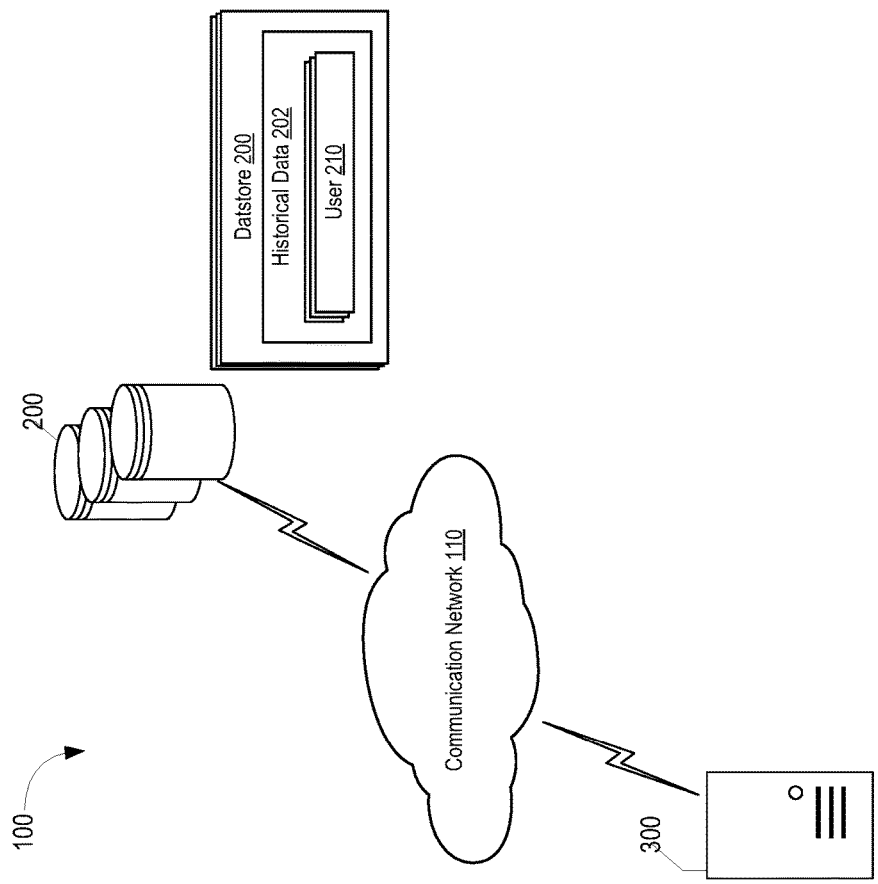
Figure 2:
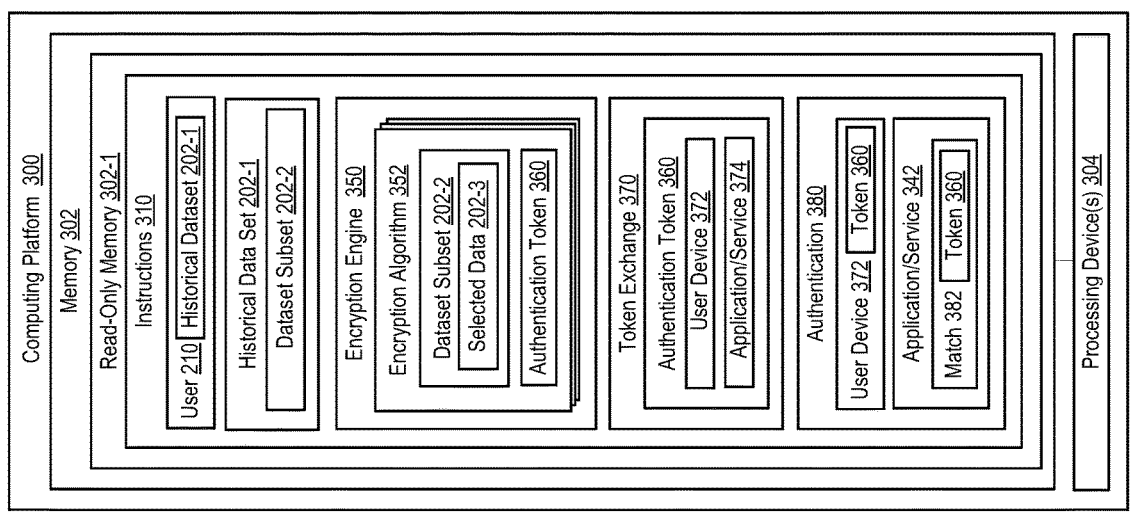
Figure 3:
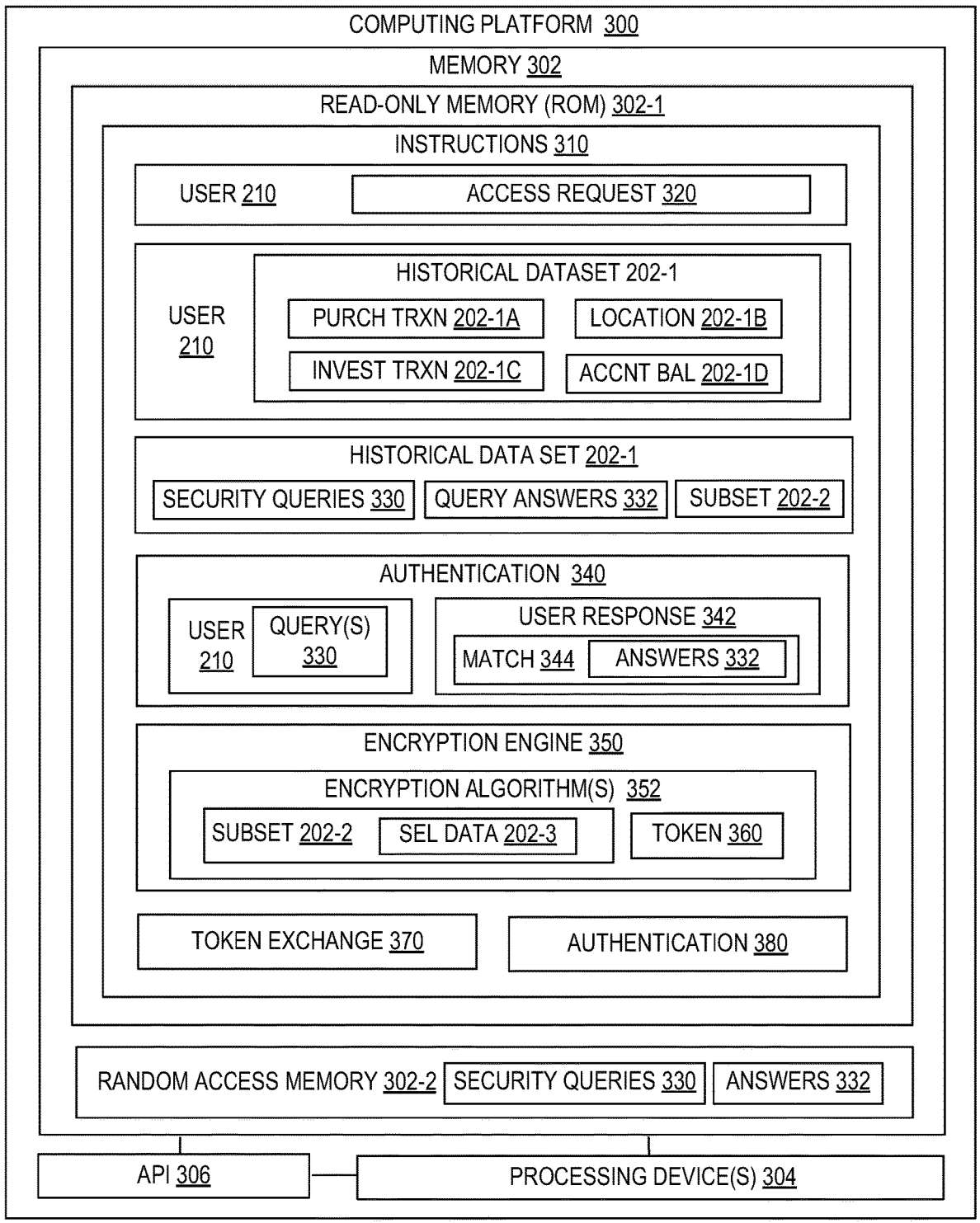
Figure 4:
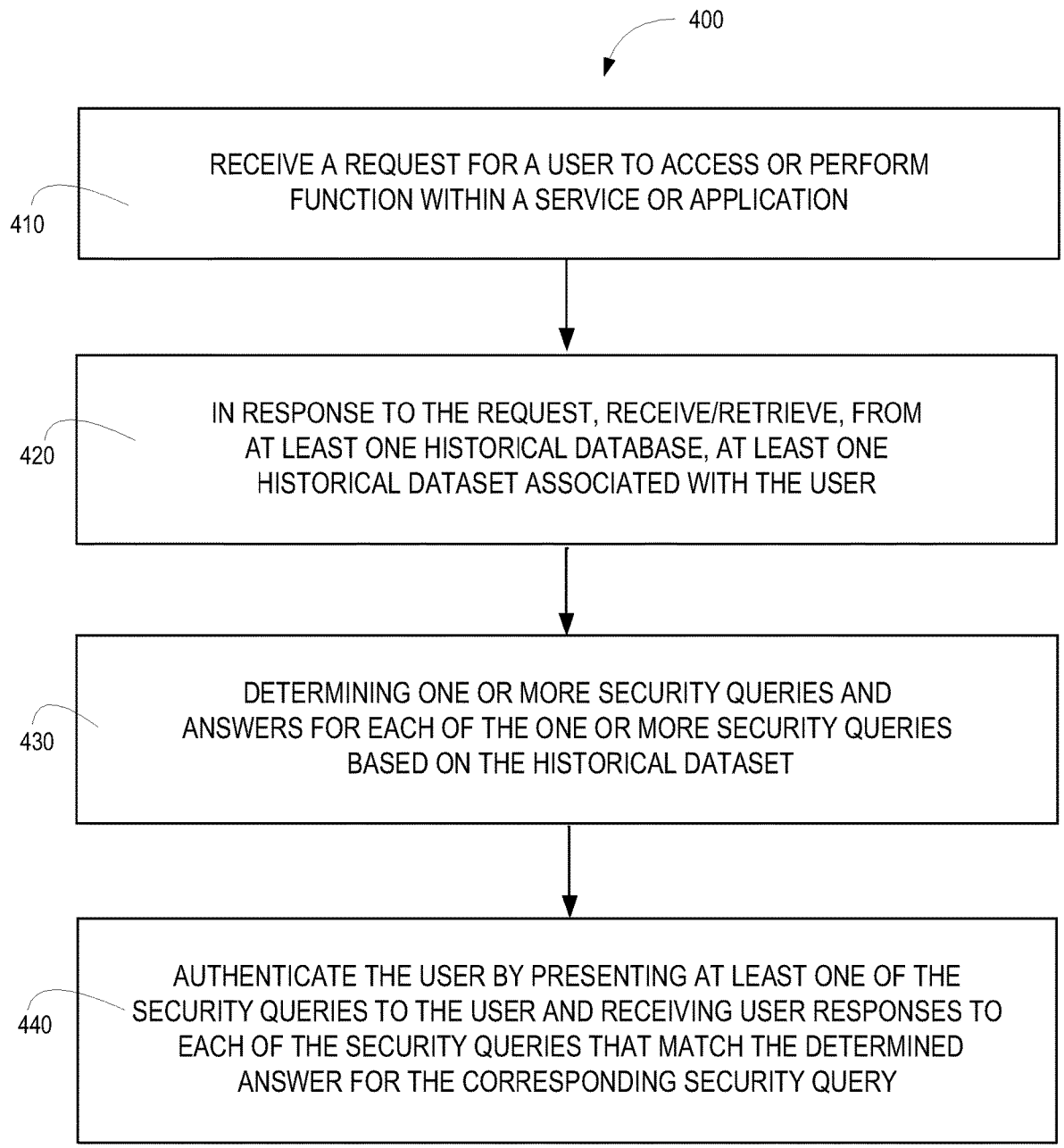

Having thus described embodiments of the disclosure in general terms, reference will now be made to the accompanying drawings, wherein:

FIG. 1 is a schematic/block diagram of a system for generating security queries for knowledge-based authentication based on historical datasets, in accordance with embodiments of the present invention;

FIG. 2 is a schematic/block diagram of a system for dual authentication incorporating security queries for knowledge-based authentication based on historical datasets and authentication tokens generated by encrypting a selected portion of the historical dataset, in accordance with alternate embodiments of the present invention;

FIG. 3 is a block diagram of a computing platform for generating security queries for knowledge-based authentication based on historical datasets, in accordance with alternate embodiments of the present invention; and FIG. 4 is a flow diagram of a method for generating security queries for knowledge-based authentication based on historical datasets, in accordance with alternate embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as JAVA, PERL, SMALLTALK, C++, PYTHON, or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform may include a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that generate dynamic security queries for knowledge-based authentication based on historical records. In this regard, once a user has a need to authenticate (e.g., gain access to an application or service or perform a function requiring authentication), the present invention retrieves or otherwise receives a historical dataset associated with the user from a historical datastore. Dynamic security queries and the answers are then determined from the historical dataset and the queries are presented to the user. The user will either have first-hand knowledge of the answers to the queries or be able to readily search within user-specific datastores to find the answers to the queries.

In specific embodiments of the invention, the historic datastores may include, but are not limited, a purchase transaction historical datastore, an investment transaction historical datastore, a user location historic datastore, a financial account balance historical datastore or the like. Thus, in such embodiments of the invention the queries and the answers are determined/derived from data in such datastores.

Moreover, in accordance with other specific embodiments of the invention, the dynamic nature of the queries and answers means that once generated, the queries and the answers are exclusively stored in temporary memory (i.e., Random Access Memory (RAM) or the like). This means that the questions and answers are permanently erased from the temporary memory after they have been presented to the user or, at a maximum, are erased from the temporary memory once the computing session is terminated.

In other specific embodiments of the invention, the presenting of the dynamic security queries is part of a two-part authentication process, in which both parts rely on the historical dataset. Specifically, in the two-part authentication process the historical dataset is relied upon by encryption algorithms that use a random subset of one or more historical datasets (including the historical dataset used to determine the queries/answers) to generate authentication tokens that are subsequently exchanged amongst a user device and/or a managing entity and the application/service. Once authentication is required, the user device/managing entity presents the authentication key to the application/service which verifies that the authentication key is the authentication key of record for the user (i.e., matches the authentication key previously exchanged/shared). In specific embodiments of the invention, the authentication key-based authentication is conducted first and, if such authentication fails or is otherwise unable to be performed, the security query knowledge-based authentication proceeds.

Thus, since the queries/answers are determined from dynamic user-specific datasets compiled at the time of authentication, the present invention is able to generate knowledge-based queries that are not capable of identification by other parties from any level of personal record searching. Moreover, since the queries/answers are time-sensitive and not stored in a user catalog or any other means of permanent computer storage, the queries and answers are not readily susceptible to being uncovered by a wrongdoer in pursuit of impersonating the user for purposes of gaining access to the user's applications and/or conducting unauthorized activities on behalf of the user.

Referring to FIG. 1, a schematic/block diagram is presented of an exemplary system 100 for generating security queries for knowledge-based authentication based on historical datasets, in accordance with embodiments of the present invention. The system 100 is implemented across a distributed communication network 110, which may include the Intranet, one or more intranets, one or more cellular networks or the like. As depicted, the system 100 includes one or more datastores 200 that are configured to store historical data 202 associated with a plurality of users 210. In specific embodiments of the system 100, the historical data 202 stored by the one or more datastores 200 include, but are not limited to, financial transaction data, including purchasing transaction data (e.g., dates/times, amounts and/or items of transactions associated with a user account), investment transaction data (e.g., number of shares of a particular stock/commodity purchased on a particular date, number of shares of a particular stock/commodity sold on a particular date, and/or the like), financial account balance data (e.g., a credit card balance on a particular date, a savings account balance on a particular date, and/or the like), geophysical location data (e.g., data indicating the geophysical location of the user on a specific date/time) and the like.

The system additionally includes a computing platform 300 having a memory 302 and one or more processing devices 304 in communication with the memory 302. The memory includes permanent storage, such as Read-Only Memory (ROM) 302-1 and temporary memory, such as Random-Access Memory (RAM) 302-2. ROM 302-1 stores instructions 310 that are executable by the one or more processing devices 304. Instructions 310 are configured to receive an access request 320 from one of the plurality of users 210. The access request 320 requests access to an application, service or functionality within an application or service and requires user authentication in order for the user to access the application or service or perform the functionality within the application or service. In response to receiving the access request 320, instructions 310 are configured to receive, or otherwise retrieve, via distributed communication network 110 from at least one of the one or more datastores 200, one or more historical datasets 202-1 associated with the user 210. In specific embodiments of the system 100, the instructions 310 may be configured to receive/retrieve the historical dataset 202-1 from one of the datastores 200, while in other embodiments of the system 100, the instructions may be configured to retrieve multiple historical datasets 202-1 from multiple different datastores 200.

Further, instructions 310 are configured to determine one or more user-specific security queries 330 and the corresponding answer(s) 332 to the one or more security queries 330 based on the historical dataset(s) 202-1. For example, in those embodiments of the system 100, in which the historical dataset 202-1 is a historical purchaser transaction dataset, the security query 330 may be the last-in-time item purchased at specified transaction location and/or retailer, the last-in-time purchase amount at a specified transaction location and/or retailer or the like. The security queries 330 may be formatted as direct questions, multiple choice questions, true/false questions or the like.

According to specific embodiments of the system, once the one or more security queries 330 and the corresponding answers 332 have been determined, the security queries 330 and answers 332 are stored exclusively in RAM 302-2. In this regard, the storage of the security queries 330 and answers 332 is limited to temporary storage, such that the security queries 330 and answers 332 are erased from memory after completion of the authentication or, at a maximum, after the completion of the user's computing session. As such, since the security queries 330 and answers 332 are only stored temporarily they are not prone to being compromised by unauthorized entities or the like.

Further, instructions 310 are configured to perform authentication 340 by presenting (e.g., visual, audio or the like) at least one of the one or more security queries 330 to the user 210 and receiving user response(s) 342 to the one or more security queries 330 that are determined to match 344 the previously determined answers(s) 332 to the corresponding one or more security queries 330. For example in specific embodiments of the system 100, the user is presented with a series of the security queries 330 and must provide correct/matching responses 342 to all or a significant majority of the security queries 330 in order for successful authentication 340 to occur (i.e., in order for the user 210 to gain access to an application or service or perform a function within the application or service).

Referring to FIG. 2, a schematic/block diagram is presented of an exemplary system 100 for dual authentication implementing (i) knowledge-based authentication based on generating security from historical datasets, and (ii) token-based authentication in which the token is generated by applying encryption algorithms to a portion of the same historical datasets, in accordance with embodiments of the present invention. Thus, the system 100 shown in FIG. 2 includes all of the elements shown in FIG. 1, however, for the sake of brevity the instructions 310 shown and described in relation to FIG. 1 are omitted from FIG. 2 and the discussion thereof.

As previously discussed in relation to FIG. 1, in response to receiving an access request 320 (shown in FIG. 1), instructions 310 are configured to receive/retrieve the historical dataset(s) from the datastores 210. The instructions 310 are further configured to determine a dataset subset 202-2 from at least one of the historical dataset(s) 202-1 and apply, via an encryption engine 350, a series of encryption algorithms 352 to selected data 202-3 of the dataset subset 202-2. The encryption algorithms 352 may be dynamic, rotating algorithms such that at any given point in time, the selected data 202-3 used as well as the types of algorithms applied to each selected data 202-3 from the dataset subset 202-2 may vary. In an exemplary embodiment of the system 100, the encryption engine 350 may be configured to apply one hundred different encryption algorithms 352 numbered 1-100 to any given selected data 202-3 from the dataset 202-2. In the same exemplary embodiment, the subset data associated with a user may comprise three years of historical account balances of a checking account, and a previous month of transaction history associated with a virtual payment network. The encryption engine 350 may then shuffle, or randomly rotate, the encryption algorithms applied to the selected data 202-3 of the dataset subset 202-2. Therefore, at one given point in time, the encryption engine 350 may apply algorithms numbered 1, 10, and 20 to the years of historical account balances of the checking account, apply algorithms numbered 45, 2, and 68 to the month of transaction history associated with the virtual payment network and the like. The results of the series of algorithms 352 may then be strung together or concatenated to generate a unique authentication token 360. By rotating both the encryption algorithms 352 used, as well as the selected data 202-3 being encrypted, the system provides a high level of security such that even if a user's historical data was compromised, it would be highly unlikely that an attacker would be able to recreate the authentication token 360 stemming from the historical dataset(s) 202-1 at any given point in time.

Instructions 310 additionally include token exchange 370, in which the authentication token 360 and information identifying the user 210 associated with the authentication token 360 is transmitted, the user device 372 and/or the managing entity system (not shown in FIG. 2) and the application/service 374 for storage.

In some embodiments, the process of authentication token generation may repeat beginning after a predetermined period of time (e.g., one day, one hour, ten minutes, or the like) in order to provide the parties of the authentication process with newly generated tokens at regular intervals. To increase the overall security of the process, in some embodiments of the system, the time intervals between new token generations may be randomly varied by the encryption engine 350.

Instructions 310 additionally include authentication 380, which in response to determining the access request 320 (shown in FIG. 1) by the user 210 for access to an application or service or performing functionality within the application/service, transmits the stored authentication token 360 from the user device 372 and/or the managing entity system to the application/service 342. Additionally, or alternatively, the system may cause the application/service 342 to send a request to the user device 372 and/or the managing entity system for the stored authentication token 360. The instructions 310 are further configured to compare the authentication token 360 received by the user device 372 or the managing entity system to the authentication token 360 stored by the application/service 374 (i.e., the most recently generated authentication token). If the received authentication token 360 matches 382 the stored authentication token 360, the instructions 310 approves the authentication of the user 210.

In specific embodiments of the system, both the token-based authentication and the knowledge-based authentication are required to be performed in order to authenticate the user 210. In other embodiments of the system 100, the token-based authentication is attempted first and, if the authentication is unable to be performed or is otherwise unsuccessfully in authenticating the user 210, only then is the knowledge-based authentication performed.

Referring to FIG. 3, a block diagram is depicted of computing platform 300, in accordance with embodiments of the present invention. In addition to providing greater detail, FIG. 3 highlights various alternate embodiments of the system 100. Computing platform 300 comprises one or more computing devices/apparatus, such as servers or the like configured to execute software programs, including instructions, engines, algorithms, modules, routines, applications, tools, and the like. Computing platform 300 includes memory 302, which may comprise volatile and non-volatile memory, such as read-only memory (ROM) 302-1 and/or random-access memory (RAM) 302-2, EPROM, EEPROM, flash cards, or any memory common to computer platforms). Moreover, memory 302 may comprise cloud storage, such as provided by a cloud storage service and/or a cloud connection service.

Further, computing platform 300 also includes processing device(s) 304, which may be an application-specific integrated circuit ("ASIC"), or other chipset, logic circuit, or other data processing device. Processing device 304 may execute an application programming interface ("API") 306 that interfaces with any resident programs, such as instructions 310 and algorithms, sub-engines/routines associated therewith or the like stored in the memory 302 of the computing platform 300.

Processing device(s) 304 may include various processing subsystems (not shown in FIG. 3) embodied in hardware, firmware, software, and combinations thereof, that enable the functionality of computing platform 300 and the operability of computing platform 300 on a distributed communication network 110 (shown in FIG. 1). For example, processing subsystems allow for initiating and maintaining communications and exchanging data with other networked devices. For the disclosed aspects, processing subsystems of processing device 304 may include any subsystem used in conjunction with instructions 310 and related engines, routines, algorithms, sub-algorithms, modules, sub-modules thereof.

Computing platform 300 additionally includes a communications module (not shown in FIG. 3) embodied in hardware, firmware, software, and combinations thereof, that enables electronic communications between computing platform 300 and other networks and/or networked devices, such as, datastores 200 and the like. Thus, the communication module may include the requisite hardware, firmware, software and/or combinations thereof for establishing and maintaining a network communication connection with one or more systems, platforms, networks, or the like.

As previously discussed in relation to FIG. 1, ROM 302-1 stores instructions 310 that are executable by the processing device(s) 304 and configured to generate security queries 330 and corresponding answers 332 for knowledge-based authentication based on historical data 202. Instructions 310 are configured to receive an access request 320 from one of the plurality of users 210. The access request 320 requests access to an application, service or functionality within an application or service and requires user authentication in order for the user to access the application or service or perform the functionality within the application or service. In response to receiving the access request 320, instructions 310 are configured to receive, or otherwise retrieve, from at least one of the one or more datastores 200 (shown in FIG. 1), one or more historical datasets 202-1 associated with the user 210. In specific embodiments of the system 100, the instructions 310 may be configured to receive/retrieve one specific historical dataset 202-1, while in other embodiments of the system 100, the instructions may be configured to retrieve multiple historical datasets 202-1 from multiple different datastores 200. The historical datasets may include, but are not limited to, a historical purchase transaction dataset 202-1A (including date/time of purchase, from whom the purchase was made (e.g., retailer or the like), items purchased or the like), a historical geophysical location dataset 202-1B (indicating a date/time and location for the user), an investment transaction dataset 202-1C (including date/time of a stock/commodity/fund or the like trade (e.g., buy or sell), the stock/commodity/fund traded or the like), a historical account balance dataset 202-1D (indicating the account balance at specific dates and times) and the like.

Further, instructions 310 are configured to determine one or more user-specific security queries 330 and the corresponding answer(s) 332 to the one or more security queries 330 based on the historical dataset(s) 202-1. For example, in those embodiments of the system 100, in which the historical dataset 202-1 is a historical purchaser transaction dataset, the security query 330 may be the last-in-time item purchased at specified transaction location and/or retailer, the last-in-time purchase amount at a specified transaction location and/or retailer or the like. The security queries 330 may be formatted as direct questions, multiple choice questions, true/false questions or any other known or future known query type.

According to specific embodiments of the system, once the three one or more security queries 330 and the corresponding answers 332 have been determined, the security queries 330 and answers 332 are stored exclusively in RAM 302-2. In this regard, the storage of the security queries 330 and answers 332 is limited to temporary storage, such that the security queries 330 and answers 332 are erased from memory after completion of the authentication or, at a maximum, after the completion of the user's computing session. As such, since the security queries 330 and answers 332 are only stored temporarily they are not prone to being compromised by unauthorized entities or the like.

Further, instructions 310 are configured to perform authentication 340 by presenting (e.g., in visual format, audio format, multimedia format or the like) at least one of the one or more security queries 330 to the user 210 and receiving user response(s) 342 to the one or more security queries 330 that are determined to match 344 the previously determined answers(s) 332 to the corresponding one or more security queries 330. For example, in specific embodiments of the system 100, the user is presented with a series of the security queries 330 and must provide correct/matching responses 342 to all or a significant majority of the security queries 330 in order for successful authentication 340 to occur (i.e., in order for the user 210 to gain access to an application or service or perform a function within the application or service).

In alternate embodiments of the invention, the instructions 310 are further configured to determine a dataset subset 202-2 from at least one of the historical dataset(s) 202-1 and apply, via an encryption engine 350, a series of encryption algorithms 352 to selected data 202-3 of the dataset subset 202-2. The encryption algorithms 352 may be dynamic, rotating algorithms such that, at any given point in time, the selected data 202-3 used, as well as, the types of algorithms applied to each selected data 202-3 from the dataset subset 202-2 may vary. The results of the series of algorithms 352 are strung together or concatenated to generate a unique authentication token 360.

Instructions 310 additionally include token exchange 370, in which the authentication token 360 and information (not shown in FIG. 3) identifying the user 210 associated with the authentication token 360 is transmitted to (i) the user device 372 (shown in FIG. 2) and/or the managing entity system (not shown in FIG. 2) and (ii) the application/service 374 (shown in FIG. 2) for storage at the user device 372/managing entity system and application/service 374.

Instructions 310 additionally include authentication 380, which in response to determining the access request 320, transmits the stored authentication token 360 from the user device 372 and/or the managing entity system to the application/service 342. Additionally, or alternatively, the system may cause the application/service 342 to send a request to the user device 372 and/or the managing entity system for the stored authentication token 360. The instructions 310 are further configured to compare the authentication token 360 received by the user device 372 or the managing entity system to the authentication token 360 stored by the application/service 374 (i.e., the most recently generated authentication token). If the received authentication token 360 matches the stored authentication token 360, the instructions 310 approves the authentication of the user 210.

As previously discussed, authentication 340 and authentication 380 may both be required for purposes of authenticating the user to access an application or service or otherwise perform a function/activity within an application or service. In alternate embodiments of the invention, authentication 340 may be conditionally performed; in response to authentication 380 being unable to be performed (e.g., inability to transmit tokens) or failing in the authentication process (e.g., tokens do not match).

Referring to FIG. 4, a flow diagram is depicted of a method 400 for knowledge-based authentication, in accordance with embodiments of the present invention. At Event 410, a request for a user to access or perform function(s)/event(s) within an application/service is received. The request requires user authentication in order for the user to access the application or service or perform the functionality within the application or service. In response to receiving the request, at Event 420 one or more historical datasets associated with the user are received, or otherwise retrieved, from at least one of historical datastores/databases. In specific embodiments of the method, one specific historical dataset may be received/retrieved, while in other embodiments of the method, multiple historical datasets are received/retrieved from multiple different datastores. The historical datasets may include, but are not limited to, a historical purchase transaction dataset (including date/time of purchase, from whom the purchase was made (e.g., retailer or the like), items purchased or the like), a historical geophysical location dataset (indicating a date/time and location for the user), an investment transaction dataset (including date/time of a stock/commodity/fund or the like trade (e.g., buy or sell), the stock/commodity/fund traded or the like), a historical account balance dataset (indicating the account balance at specific dates and times) and the like.

At Event 430, one or more user-specific security queries and the corresponding answer(s) to the one or more security queries are determined based on the historical dataset(s). For example, in those embodiments of the method, in which the historical dataset is a historical purchaser transaction dataset, the security query may be the last-in-time item purchased at a specified transaction location and/or retailer, the last-in-time purchase amount at a specified transaction location and/or retailer or the like. The security queries may be formatted as direct questions, multiple choice questions, true/false questions or any other known or future known query type.

At Event 440, authentication is performed by presenting (e.g., in visual format, audio format, multimedia format or the like) at least one of the one or more security queries to the user and receiving user response(s) to the one or more security queries that are determined to match the previously determined answers(s) to the corresponding one or more security queries. For example, in specific embodiments of the method, the user is presented with a series of the security queries and must provide correct/matching responses to all or a significant majority of the security queries in order for successful authentication to occur (i.e., in order for the user to gain access to an application or service or perform a function within the application or service).

Thus, as described in detail above, present embodiments of the invention include systems, methods, computer program products and/or the like for generating dynamic security queries for knowledge-based authentication based on historical records. In this regard, once a user has a need to authenticate (e.g., gain access to an application or service or perform a function requiring authentication), a historical dataset associated with the user is retrieved from a historical datastore. Dynamic security queries and the answers are then determined from the historical dataset and presented to the user. The user will either have first-hand knowledge of the answers to the queries or be able to readily search within user-specific datastores to find the answers to the queries. The dynamic nature of the queries and answers means that once generated, the queries and the answers are exclusively stored in temporary memory (i.e., Random Access Memory (RAM) or the like). This means that the questions and answers are permanently erased from memory after they have been presented to the user or, at a maximum, are erased from memory once the computing session is terminated. Thus, since the queries/answers are determined from dynamic user-specific datasets compiled at the time of authentication, the present invention is able to generate knowledge-based queries that are not capable of identification by other parties from any level of personal record searching.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for user authentication, the system comprising:

one or more datastores, each datastore configured to store historical data associated with a plurality of users;

a computing platform including a memory, and one or more processing devices in communication with the memory, wherein the memory comprises Random Access Memory (RAM) and Read-Only Memory (ROM), wherein the ROM stores instructions that are executable by the one or more processing devices and configured to:

receive, from at least one of the one or more datastores, a historical dataset associated with one of the plurality of users, apply, via an encryption engine, a plurality of encryption algorithms to a selected subset of data from the historical dataset, wherein the selected subset is selected at random, generate, via the encryption engine, an authentication token, wherein the authentication token is based on a set of results of the plurality of encryption algorithms, in response to generating the authentication token, exchange the authentication token amongst (i) a service or an application, and (ii) at least one of a user device or a managing entity, for storage at (i) the service or application, and (ii) at least one of the user device or the managing entity, receive, from the one of the plurality of users, a request to access the service or the application, in response to receiving the request, receive, from the at least one of the one or more datastores, the historical dataset associated with the one of the plurality of users, determine one or more security queries and answers for the one or more security queries based on the historical dataset, store the one or more security queries and the answers for the one or more security queries exclusively in the RAM, authenticate the user by (i) presenting at least one of the one or more security queries to the user and receiving user responses to the least one of the one or more security queries that match the answers for the one or more security queries and (ii) transmitting the authentication token from the user device or the managing entity to the service or application to verify that the transmitted authentication token matches the exchanged authentication token stored at the service or the application, and in response to authenticating the user, erase the one or more security queries and the answers for the one or more security queries from the RAM.

2. The system of claim 1, wherein the instructions are configured to initially attempt to authenticate the user verifying that the transmitted authentication token matches the exchanged authentication token stored at service or application and, in an instance in which the verification fails, authenticate the user by presenting at least one of the one or more security queries to the user and receiving user responses to the least one of the one or more security queries that match the answers for the one or more security queries.

3. The system of claim 1, wherein the one or more datastores further comprises a purchase transaction datastore configured to store historical purchase transaction data for purchase transactions conducted by the plurality of users.

4. The system of claim 3, wherein the instructions configured to receive, from the at least one of the one or more datastores, a historical dataset associated with one of the plurality of users are further configured to receive, from the historical purchase transaction datastore, a historical purchase transaction dataset for purchase transactions conducted by the one of the plurality of users, and wherein the instructions configured to determine one or more security queries and answers for the one or more security queries based on the historical dataset are further configured to determine the one or more security queries and the answers for the one or more security queries based on the historical purchase transaction dataset.

5. The system of claim 3, wherein the one or more datastores further comprise at least one of (i) a historical investment datastore, (ii) a historical account balance datastore, and (iii) a historical user location datastore.

6. The system of claim 5, wherein the instructions configured to receive, from the at least one of the one or more datastores, a historical dataset associated with one of the plurality of users are further configured to receive, from the historical purchase transaction datastore and at least one of (i) the historical investment datastore, (ii) the historical account balance datastore, and (iii) the historical user location datastore, a historical purchase transaction dataset for purchase transactions conducted by the one of the plurality of users and at least one of (a) a historical investment transaction dataset for investment transactions conducted by the one of the plurality of users, (b) a historical account balance dataset for a financial account held by the one of the plurality of users, and (c) a historical location dataset for locations at which the one of the plurality of users physically resided at associated points in time, and wherein the instructions configured to determine one or more security queries and answers for the one or more security queries based on the historical dataset are further configured to determine the one or more security queries and the answers for the one or more security queries based on the historical purchase transaction dataset and at least one of (a) the historical investment transaction dataset, (b) the historical account balance dataset, and (c) the historical user location dataset.

7. A computer-implemented method for user authentication, the computer-implemented method is executable by one or more computing processor devices, the method comprising:

receiving, from at least one historical datastore, at least one historical dataset associated with a user;

applying, via an encryption engine, a plurality of encryption algorithms to a selected subset of data from the at least one historical dataset, wherein the selected subset is selected at random;

generating, via the encryption engine, an authentication token, wherein the authentication token is based on a set of results of the plurality of encryption algorithms;

in response to generating the authentication token, exchanging the authentication token amongst (i) a service or an application, and (ii) at least one of a user device or a managing entity, for storage at (i) the service or application, and (ii) at least one of the user device or the managing entity;

receiving a request for a user to access the service or the application;

in response to receiving the request, receiving, from the at least one historical datastore, the at least one historical dataset associated with the user;

determining one or more security queries and answers for the one or more security queries based on the at least one historical dataset; and storing the one or more security queries and the answers for the one or more security queries exclusively in RAM;

authenticating the user by (i) presenting at least one of the one or more security queries to the user and receiving user responses to the least one of the one or more security queries that match the answers for the one or more security queries and (ii) transmitting the authentication token from the user device or the managing entity to the service or application to verify that the transmitted authentication token matches the exchanged authentication token stored at the service or the application; and, in response to authenticating the user, erasing the one or more security queries and the answers for the one or more security queries from the RAM.

8. The computer-implemented method of claim 7, wherein verifying that the transmitted authentication token matches the exchanged authentication token stored at the service or application occurs prior to presenting at least one of the one or more security queries to the user.

9. The computer-implemented method of claim 7, wherein receiving, from the at least one historical datastore, the at least one historical dataset associated with the user further comprises receiving, from a purchase transaction datastore, a historical purchase transaction dataset comprising purchase transactions conducted by the user.

10. The computer-implemented method of claim 9, wherein determining the one or more security queries and the answers for the one or more security queries based on the historical dataset further comprises determining the one or more security queries and the answers for the one or more security queries based on the historical purchase transaction dataset.

11. The computer-implemented method of claim 7, wherein receiving, from the at least one historical datastore, the at least one historical dataset associated with the user further comprises receiving, from at least one of (i) a historical investment datastore, (ii) a historical account balance datastore, and (iii) a historical user location datastore, at least one of (a) a historical investment transaction dataset comprising investment transactions conducted by the user, (b) a historical account balance dataset comprising account balances incurred by the user, and (c) a historical location dataset comprising geo-physical locations at which the user has been located, and
wherein determining the one or more security queries and the answers for the one or more security queries based on the historical dataset further comprises determining the one or more security queries and the answers for the one or more security queries based on at least one of (a), the historical investment transaction dataset, (b) a historical account balance dataset, and (c) the historical location dataset.

12. A computer program product including a non-transitory computer-readable medium, the non-transitory computer-readable medium comprising:
   a first set of codes for causing a computer to receive, from at least one historical datastores, at least one historical dataset associated with a user;
   a second set of codes for causing a computer to apply, via an encryption engine, a plurality of encryption algorithms to a selected subset of data from the historical dataset, wherein the selected subset is selected at random;
   a third set of codes for causing a computer to generate, via the encryption engine, an authentication token, wherein the authentication token is based on a set of results of the plurality of encryption algorithms;
   a fourth set of codes for causing a computer to, in response to generating the authentication token, exchange the authentication token amongst (i) a service or an application, and (ii) at least one of a user device or a managing entity, for storage at (i) the service or application, and (ii) at least one of the user device or the managing entity;
   a fifth set of codes for causing a computer to receive a request for the user to access the service or the application;
   a sixth set of codes for causing a computer to, in response to receiving the request, receive, from the at least one historical datastore, the at least one historical dataset associated with the user;
   a seventh set of codes for causing a computer to determine one or more security queries and answers for the one or more security queries based on the at least one historical dataset;
   an eighth set of codes for causing a computer to store the one or more security queries and the answers for the one or more security queries exclusively in RAM;
   a ninth set of codes for causing a computer to authenticate the user by (i) presenting at least one of the one or more security queries to the user and receiving user responses to the least one of the one or more security queries that match the answers for the one or more security queries and (ii) transmitting the authentication token from the user device or the managing entity to the service or application to verify that the transmitted authentication token matches the exchanged authentication token stored at the service or the application; and
   a tenth set of codes for causing a computer to, in response to authenticating the user, erase the one or more security queries and the answers for the one or more security queries from the RAM.

13. The computer program product of claim 12, wherein the sixth set of codes are further configured to cause the computer to receive, from a purchase transaction datastore, a historical purchase transaction dataset comprising purchase transactions conducted by the user, and wherein the seventh set of codes are further configured to cause the computer to determine the one or more security queries and the answers for the one or more security queries based on the historical purchase transaction dataset.

14. The computer-implemented method of claim 12, wherein the sixth set of codes are further configured to cause the computer to receive, from at least one of (i) a historical investment datastore, (ii) a historical account balance datastore, and (iii) a historical user location datastore, at least one of (a) a historical investment transaction dataset comprising investment transactions conducted by the user, (b) a historical account balance dataset comprising account balances incurred by the user, and (c) a historical location dataset comprising geo-physical locations at which the user has been located, and
   wherein the seventh set of codes is further configured to cause the computer to determine the one or more security queries and the answers for the one or more security queries based on at least one of (a), the historical investment transaction dataset, (b) a historical account balance dataset, and (c) the historical location dataset.

* * * * *